H. TIDEMAN.
APPARATUS FOR ENABLING THE BLIND TO READ.
APPLICATION FILED SEPT. 16, 1908.

1,149,547.

Patented Aug. 10, 1915.
2 SHEETS—SHEET 1.

WITNESSES:
David S. Houlfish
Wm. Berghahn

INVENTOR.
HENRY TIDEMAN
BY: McNeil & Meier
ATTYS.

H. TIDEMAN.
APPARATUS FOR ENABLING THE BLIND TO READ.
APPLICATION FILED SEPT. 16, 1908.
1,149,547.
Patented Aug. 10, 1915.
2 SHEETS—SHEET 2.
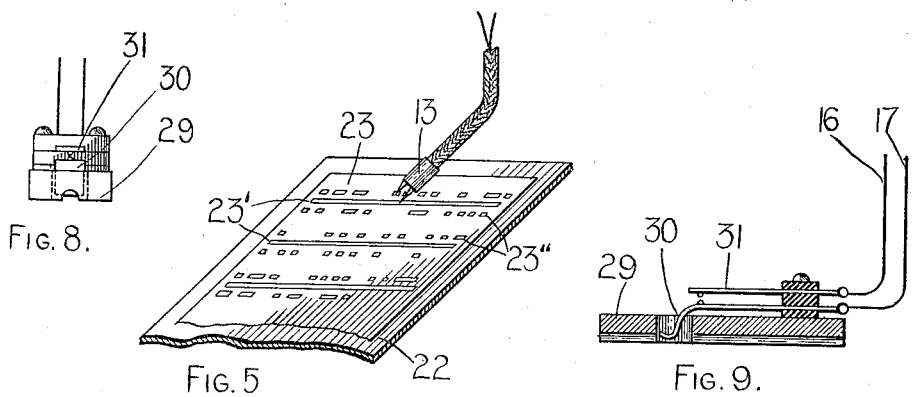
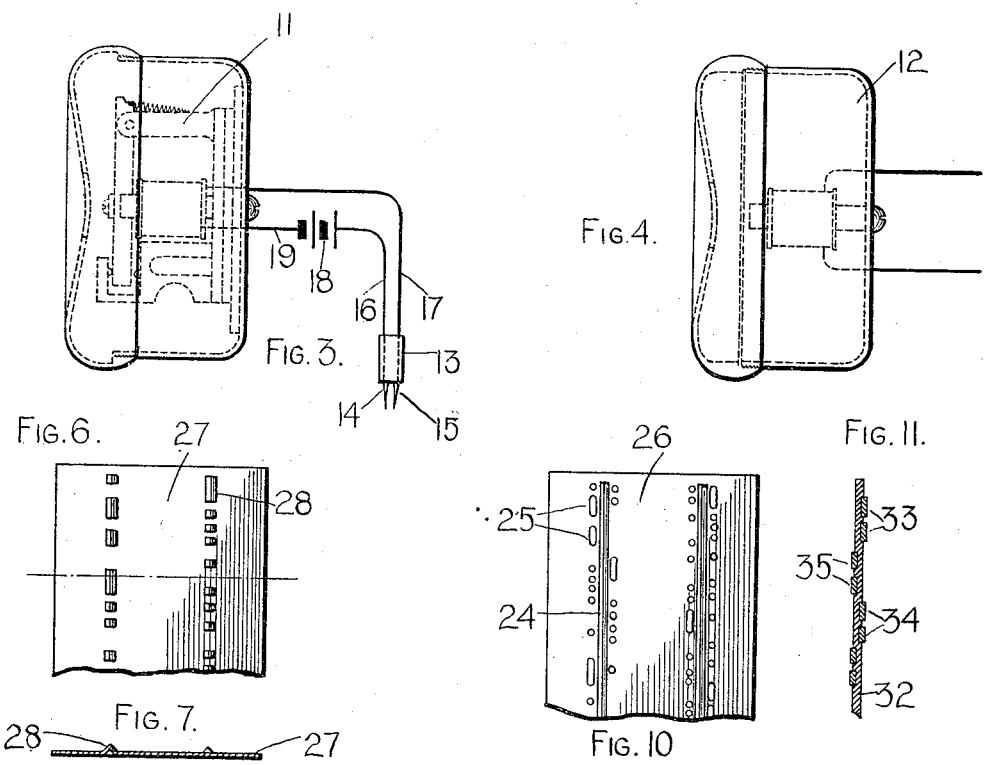
WITNESSES:
INVENTOR.
HENRY TIDEMAN
BY
ATTYS.

UNITED STATES PATENT OFFICE.

HENRY TIDEMAN, OF MENOMINEE, MICHIGAN.

APPARATUS FOR ENABLING THE BLIND TO READ.

1,149,547.

Specification of Letters Patent.

Patented Aug. 10, 1915.

Application filed September 16, 1908. Serial No. 453,351.

*To all whom it may concern:*

Be it known that I, HENRY TIDEMAN, a citizen of the United States of America, and a resident of Menominee, county of Menominee, and State of Michigan, have invented a new and useful Improvement in Apparatus for Enabling the Blind to Read, of which the following is a specification.

My invention relates to apparatus and methods for enabling the blind to read.

It relates particularly to devices for translating physical records into sounds in accordance with an intelligible code; so that the sense of hearing may be made to serve, instead of the sense of sight, in conveying the intelligence recorded on the physical records to the brain of the user.

Methods of printing in which the characters are so formed that the reader may distinguish them by touch are, of course, well known. My invention employs methods of printing or forming characters which become intelligible to the user, not through the sense of touch, but through the sense of hearing; the characters being so arranged that by suitable manipulation on the part of the user they will cause such alterations in the condition of an electrical circuit as to produce audible response by a receiving device.

In the specific embodiments of my invention, shown and described in this application, the physical record is prepared in such form as to produce, when translated into audible signals, Morse code or a substitute therefor.

Figure 1:
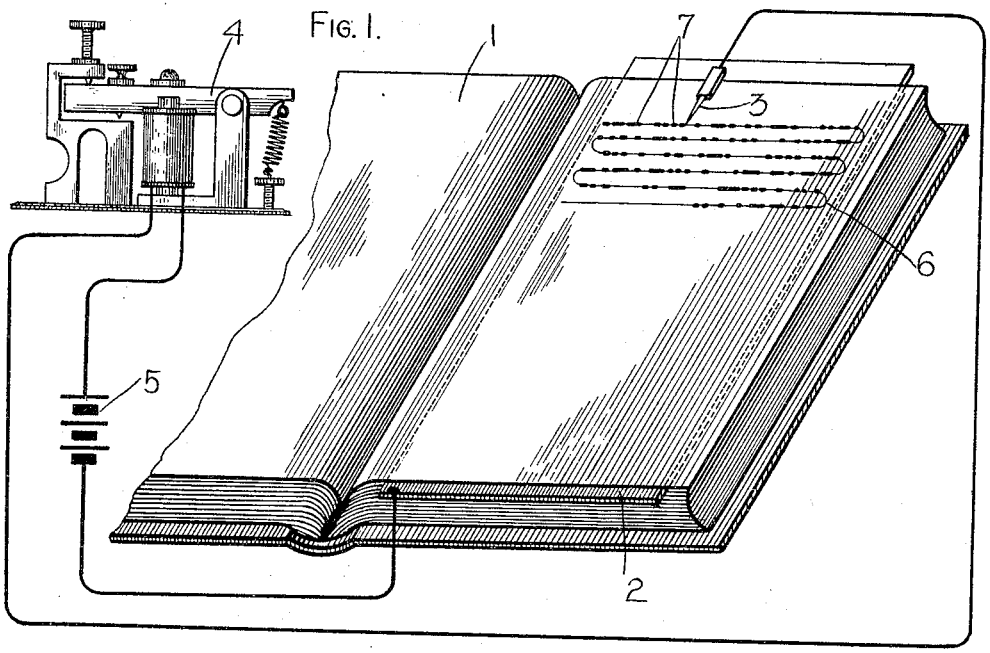
Figure 2:
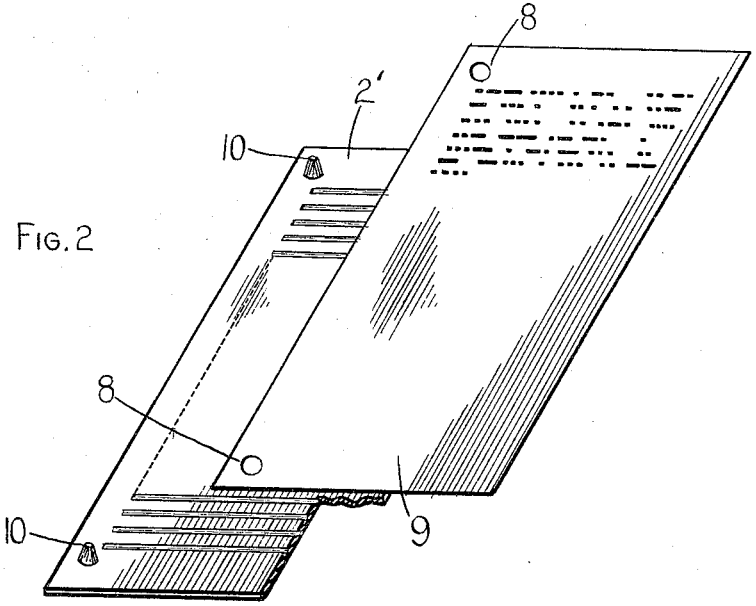

In the drawings, Figure 1 shows the general arrangement of the parts in an embodiment of my invention, the physical record being shown in its preferred form; Fig. 2 shows a modified form of my invention, embodying a corrugated guide plate; Fig. 3 shows a diagram of the apparatus of my invention in which a head receiving device is employed instead of a stationary one as shown in Fig. 1, a double-point stylus being shown also; Fig. 4 shows an alternative receiving device for Fig. 1 or Fig. 3; Fig. 5 shows a modified form of physical record with the contact device of Fig. 3 in place upon it; Figs. 6 and 7 show plan and section respectively of another type of record, the section of Fig. 7 being taken on the dot and dash line; Fig. 8 shows an end elevation of a type of contact device for the form of record shown in Figs. 6 and 7; Fig. 9 shows a sectional view of the contact device of Fig. 8; Fig. 10 shows another type of record; Fig. 11 shows an edge view of another type of record.

Referring to Fig. 1, 1 is a book upon the pages of which are embossed grooves, and within which grooves are disposed perforations arranged in suitable code to form an intelligible record; 2 is a metal plate forming one terminal of an electrical circuit and adapted to be placed in the book under the page which is being read. A stylus 3, having a smooth, hard, metallic point, forms the other terminal of the electrical circuit. Between the stylus 3 and the plate 2, there is connected a telegraph sounder 4 or other suitable receiving device, and a battery 5 or other suitable source of electrical energy. In my preferred form of record, I provide a groove or track as indicated in the light sinuous line 6 as shown on the right-hand page of the book of Fig. 1, which groove or track is preferably formed by embossing, the surface of the paper being indented by pressure or otherwise. This groove or track so formed may readily be followed by a stylus in the hand of a blind person, and experience has shown that but little practice is required in attaining a proficiency. Arranged within the sinuous embossed track, I provide perforations 7, preferably in the form of dots and dashes separated by suitable spaces, as in the Morse telegraphic code. Any other code may be employed if desired.

In operating the devices of Fig. 1, the reader places the metallic plate 2 under the page to be read, and then with the stylus feels for the left-hand end of the upper groove. This he follows to the right to the end of this groove, and then by the short curve his stylus is led to the groove below which he follows to the left, continuing to the third groove, which he follows to the right, etc. As the point of the stylus passes over the perforations, the electrical circuit is closed, and impulses corresponding to the dots and dashes of the perforations pass through the magnet of the sounder 4. The sounder therefore translates the perforated code of the page into an audible code readily intelligible.

It is obvious that instead of employing the sinuous grooved track as shown in Fig. 1, the grooves may be arranged merely in parallel lines without connecting curves, in which case the reader preferably would move his stylus from left to right over each of the separate tracks.

Instead of employing the embossed track in combination with the perforations which form the recorded message, I may merely perforate the page, and form the guide for the stylus by using a metal plate provided with grooves, which grooves may be felt through the thickness of the page. In the former instance, a rather thick page is required, while in the latter instance a rather thin page would be required, resulting in a thinner volume for the same number of pages, and in a smaller volume for the same recorded message. Such a grooved plate, I show at 2' in Fig. 2. When this is used, it becomes necessary that the plate always shall occupy the same relative position with respect to the page, and to accomplish this I provide perforations 8, 8, in the page 9, which perforations are adapted to register with pins, 10, 10, on the plate 2'. Two of these perforations on each page usually suffice, and as these perforations may be put into the page by the same operation by which the code perforations are made, the guide perforations and the code perforations always will keep the proper relative positions. In using this modification of my invention, the plate 2' is inserted in such position that the projections, 10, 10, pass through the register holes 8, 8, of the page 9, after which the reader will follow the perforations by feeling through the page for the grooves upon the corrugated guide plate beneath, which always will lie immediately beneath the rows of perforations. Obviously, also, my system of devices would be complete for operation with the thin perforated page, unembossed, even though the grooved or corrugated contact plate were not available, since a flat conducting contact plate might be placed under the sheet and the lines of perforations might be followed readily without the guide groove, or by the aid of a straight edge placed upon the sheet.

Referring to Fig. 3, 11 is a miniature telegraph sounder, built for convenience in a case similar to that of a head telephone receiver. The head telephone receiver 12 of Fig. 4 may be substituted if desired. The reading device 13 consists of an insulation handle having two conducting spring points 14 and 15 projecting from one end thereof. Conductors 16 and 17 form a flexible cord, conductor 17 connecting tip 15 to sounder 11, and conductor 16 connecting tip 14 to battery 18, whence circuit is completed through conductor 19 to sounder 11. In a portable type of instrument the battery 18 would be a pocket battery, probably of a single dry cell, and all conductors would be flexible cords, the sounder 11 being supported at the ear by a head band, leaving both hands free to control the reading device 13.

In Fig. 5, 22 is an electrical conducting plate, such as a thin sheet of aluminum, and 23 is a thin sheet of insulating material, such as paper. In the sheet of insulating material, which constitutes the physical record in Fig. 5, slots 23' are cut through the sheet, and adjacent to the slots 23' are openings 23'' of various sizes; the openings 23'' are so arranged as to be in lines substantially parallel to slots 23', and when read in a predetermined direction, constitute a translatable code. Preferably a slot has two rows of code holes, one on either side of the guide slot 23'. To use the device, the reading device 13 is drawn across the sheet 23 with one point, as 14, in a guide slot 23', the distance between points 14 and 15 being such as to permit point 15 to drop through the code holes and to make electrical contact with plate 23. Thus the circuit is closed at each code hole. Having drawn the reading pen 13 through the length of a slot 23', and having thus translated the code holes upon one side of the slot, the pen is drawn along the same guide slot again with its free point upon the other row of code holes, and thus two rows of code holes are read with but a single guide slot. This accomplishes the object of maintaining a maximum strength of paper by the punching of a minimum number of guide slots, and at the same time reduces the area of the record upon the page, so that a larger record is placed upon any given page.

If desired, the guide slot 23' may be replaced by an embossed rib in the paper, such as shown at 24 in Fig. 10, the code holes 25 being punched adjacent to the rib, and a pen having but a single conducting point, as pen 3 in Fig. 1, may be used. It is manifest also that points 14 and 15 may be so small and so near together that both may drop through any code hole 25 when guided by the embossed rib, thus effecting an operating system without electrical connection to the plate 2. In a record such as 26 in Fig. 10, having an embossed rib as a guide rather than a guide slot 23', the code holes 25 may be punched on either side of the embossed rib, the rib being embossed upwardly.

The record shown in Fig. 6 is an embossed record, a section being shown in Fig. 7. Dots and dashes of a predetermined code are embossed in lines approximately straight.

In all the figures, I have drawn the lines of the record as straight lines. It will be found in some ways advantageous and at some times may be preferred to make the lines upon the page arcs of a circle of which the reader's forearm is the radius. This will enable the elbow to rest upon the table, at the same time permitting the hand to swing easily from end to end of the curved line of the record and to return with a minimum of effort to the beginning of the succeeding line. In a record such as 26 of Fig. 10, where a single guide is used for two lines of record, the record may read always in the same direction above the guides and in the alternative direction below the guide, the position of the record with respect to the guide thus determining the direction of reading. The advantages gained are (1st) the saving in time between successive lines due to the fact that the hand has no great distance to travel, and (2nd) the minimum interruption to translation of the record, since the beginning of one line follows so closely upon the ending of the preceding line that the translation is substantially continuous. Where the code holes are perforated in a sinuous depressed groove with the depression acting as a guide for the reading pen, as in Fig. 1, the conformation of the line ends will determine the direction of reading the record of each line; the succeeding lines being read continuously without lifting the pen from the record, the advantages above outlined are gained.

In Fig. 6, 27 is a sheet of material capable of being embossed. As the record 27 has no electrical functions it is not necessary that it be of insulating material. The bosses 28 are arranged in rows. Figs. 8 and 9 show the translating device which consists of base block 29 adapted to slide over the surface of the record 27 and having a groove in its sliding face adapted to straddle a row of the bosses 28. Projecting into the groove and approaching very closely or even riding in contact with the surface of the record is the electrical reading spring 30. It follows that as the reading device is drawn over the row of bosses, the reading spring 30 will be lifted by each boss and a series of electrical contacts will be made with the contact spring 31, the length of each contact being determined by the length of the boss over which the reading spring 30 is passed. The springs 30 and 31 are connected upon the wires 16 and 17 of Fig. 3 when the record 27 is used.

In Fig. 11 a type of record 32 is shown in which the code is printed upon the sheet with electrically conducting ink and the sheet itself is of insulating material. Pen 13 is adapted to read this record when points 14 and 15 are near each other. The conducting ink prints the code in lines, and the pen 13 is drawn along the lines, following the lines by skill of the reader or by a guide ruler placed upon the page, or by the corrugated plate 2' which, however, for this use, need not be electrically conducting. Where the lines of the record are adapted to be read in different directions alternately, the lines may be grouped in pairs, the upper line of each pair being read in a given direction and the lower line in the reverse direction. Thus a pair is shown at 33 and the succeeding pair at 34. The advantage of this record is that a substantially flat sheet is produced which is suitable for binding in book form. The conducting ink 33, 34, is pressed into the surface of the paper to a considerable extent, thereby securing an intimate engagement with the paper surface. Such a record may be printed upon an ordinary printing press with a single set of types, the sheet resting upon a plane platen and the process being in all respects similar to the printing of an ordinary printed page except that electrically conducting ink must be used or that the record when printed shall be faced with a conducting face after having been printed. This may be accomplished by dusting the ink while wet with a metal powder as is the present practice in some processes in printing with bronzes.

Records of the types of Fig. 11 are particularly adapted for printing upon both sides of the record sheet. In the record of the type of Fig. 11, unless the record sheet be of sufficient thickness, it may be desirable to stagger the lines upon the two sides of the sheet as shown in Fig. 11, lines 33 and 34 being upon one side and lines 35 upon the other side of the sheet.

Having thus described my invention, what I claim as new and desire to secure by United States Letters Patent is:

1. In a device for the blind, a perforated record having embossed guides and code holes, said code holes being disposed in lines, each embossed guide having two lines of code holes, substantially as described.

2. In a device for the blind, a perforated record having embossed guides and code holes, said code holes being disposed in lines, each embossed guide having a plurality of lines of code holes, substantially as described.

3. In a device for the blind, a perforated record having embossed guides and code holes, said code holes being disposed in lines, each embossed guide having two lines of code holes, said lines of code holes being disposed on both sides of said embossed guide, substantially as described.

4. In a device for the blind, a perforated record having embossed guides and code holes, said code holes being disposed in lines, each embossed guide having two lines of code holes, said lines of code holes being disposed on both sides of said embossed guide and equidistant therefrom, substantially as described.

5. In a device for the blind, a plurality of perforated record sheets secured at one edge substantially in book form; a loose metal plate adapted to be placed under any one of said sheets, and a stylus to engage the plate through the holes of the record sheet to complete a circuit with said plate, substantially as described.

Signed by me at Menominee, county of Menominee and State of Michigan in the presence of two witnesses.

HENRY TIDEMAN.

Witnesses:
L. JACKMAN,
F. J. DONOVAN.

Copies of this patent may be obtained for five cents each, by addressing the "Commissioner of Patents. Washington, D. C."